United States Patent

[11] 3,619,396

| [72] | Inventor | Raoul Walon |
| | | Brussels, Belgium |
| [21] | Appl. No. | 795,024 |
| [22] | Filed | Jan. 29, 1969 |
| [45] | Patented | Nov. 9, 1971 |
| [73] | Assignee | CPC International Inc. |

[54] ENZYMATIC PRODUCTION OF GLUCONIC ACID
7 Claims, No Drawings

| [52] | U.S. Cl. | 204/180 P, 195/36 |
| [51] | Int. Cl. | B01d 13/02 |
| [50] | Field of Search | 204/180 P, 301; 195/36 |

[56] References Cited
UNITED STATES PATENTS

| 3,051,640 | 8/1962 | Traxler | 204/180 P |
| 3,330,749 | 7/1967 | Kuwata et al. | 204/180 P |
| 3,369,906 | 2/1968 | Chen | 99/77 |
| 3,398,078 | 8/1968 | Gregor | 204/180 P |
| 3,446,672 | 5/1969 | Giner | 136/86 |
| 3,459,650 | 8/1969 | Hiraiwa et al. | 204/180 P |

*Primary Examiner*—John H. Mack
*Assistant Examiner*—A. C. Prescott
*Attorneys*—Frank E. Robbins, James L. Bailey, Janet E. Price and Robert D. Weist

ABSTRACT: A process for the enzymatic production of gluconic acid is disclosed. In the process, an electrodialysis step is used to recover active enzyme.

ENZYMATIC PRODUCTION OF GLUCONIC ACID

The present invention relates to the enzymatic production of gluconic acid. More particularly, the present invention concerns a process wherein a glucose bearing material is oxidized in the presence of an enzyme to produce gluconic acid.

As employed herein "glucose oxidase" means $\beta$-d-glucose:$O_2$ oxidoreductase (E.C.1.1.3.4.). Glucose oxidase transfers two hydrogen atoms from the CHOH group of glucose to $O_2$ with the formation of CO and $H_2O_2$.

Heretofore, glucose oxidase has found commercial applications in removing traces of glucose, and in removing traces of oxygen, from food products. For example, glucose oxidase has been commercially to remove residual reducing sugars from dry egg white and dry whole egg. It also has been added to foods such as beer, wine, fruit juices, mayonnaise, and the like which are subject to oxidative deterioration when exposed to the continued presence of small amounts of oxygen. In addition to these commercial applications, glucose oxidase has also been used extensively as an analytical tool for the determination of glucose.

Glucose oxidase has not been used for the commercial production of gluconic acid. A main reason which has precluded such a use is the cost of the enzyme.

It is an object of the present invention to provide a practical process for the enzymatic production of gluconic acid.

It is an object of the present invention to provide a continuous process for the enzymatic production of gluconic acid.

A still further object is to provide an enzymatic process for the production of gluconic acid in which glucose oxidase may be recovered without being irreversibly inactivated.

A still further object is to provide a process for the enzymatic production of gluconic acid in which process the glucose oxidase is reused.

It has now been discovered that these as well as other objects may be realized by means of the present invention. Briefly, the present invention involves a process in which an electrodialysis step is used.

In the process of the present invention, a glucose bearing material, generally in the form of a concentrated aqueous solution or liquor, is subjected to an enzymatic conversion using glucose oxidase. Thereafter, the conversion liquor is subjected to an electrodialysis step to separate gluconic acid and to recover active enzyme.

The initial (enzymatic conversion) step of the process of this invention is known in the art and per se forms no part of the present invention. Briefly, the enzymatic conversion of glucose to gluconic acid involves treating a glucose bearing material, generally in the form of an aqeuous solution, with an enzyme preparation having glucose oxidase and catalase activity, in the presence of a free oxygen source such as hydrogen peroxide. During this enzyme conversion step, the reaction media is controlled so as to favor the desired reaction. Since most enzyme preparations function most effectively within a specified pH range, and since in the glucose oxidase conversion of glucose, acid (gluconic) is continuously formed, it is necessary to continuously regulate the pH of the reaction media throughout the enzymatic conversion. Generally, if the pH is maintained between about 4.2 and about 7, preferably between about 5 and 6, the conversion proceeds satisfactorily. A common method of regulating the pH involves the continuous addition of an alkali, such as sodium hydroxide. The alkali, of course, functions to neutralize the gluconic acid to a corresponding gluconate, e.g. sodium gluconate. Heretofore, attempts to regulate the pH by the use of alkali have created additional problems. For example, the addition of alkali may result in the irreversible inactivation of the enzyme, necessitating the use of additional quantities of enzyme preparation. U.S. Pat. No. 2,651,592 discloses a procedure for the glucose oxidase conversion of glucose to gluconic acid, but does not disclose a practical process for separating gluconic acid and recovering active glucose oxidase.

While the prior art discloses the enzymatic conversion of glucose to gluconic acid, it does not teach a process for effecting such a conversion in a practical manner which results in the separation of gluconic acid and the recovery of enzyme which may be reused in the process.

The second (electrodialysis) step of applicant's process provides means for the practical separation of gluconic acid and the recovery of active enzyme.

In the electrodialysis step, the conversion liquor from the previous step is subjected to electrodialysis in multiple-membrane electrodialysis equipment.

Electrodialysis equipment suitable for use in the present invention may be of conventional design. Ordinarily, the electrodialysis equipment will comprise a large number, perhaps several hundred, alternately spaced anion and cation perselective membranes with spacer members therebetween. The spacer members provide compartments through which process streams are circulated over the surfaces of the membranes. The terminal chambers of the equipment contain electrodes for passing a direct current through all the compartments. A stream of conversion liquor from the first step of the process and a waste water stream are passed through alternate chambers by means of suitable manifolds. Both these streams are controlled as to rate of flow, pressure, temperature and the like. When a direct voltage is applied across the electrodes of the unit, gluconate anions present in the conversion liquor stream move through the adjacent anion permeable membrane into the waste water stream where they combine with hydrogen ions to form gluconic acid. The enzyme remains in the effluent conversion liquor stream which is returned to the first step of the process. A discussion of electrodialysis as a unit operation may be found in Encyclopedia of Chemical Technology, Kirk-Othmer, Second Edition, Volume 7, pages 846–865.

The following example will further describe the process of the present invention. In the example, as well as throughout this specification and claims, all references to parts or percentages are by weight unless otherwise expressly indicated.

EXAMPLE

The glucose bearing starting material employed in this example consisted of three liters of aqueous syrup containing 688 grams, dry substance, of glucose. This syrup, at a temperature of 25° C., an initial pH of 5.5, and a D.E. of 100, and 0.688 grams of a commercial glucose oxidase preparation designated "Ovazyme" (supplied by Fermco Laboratories) were added to a reaction vessel.

50 Volumes of hydrogen peroxide were added, at a flow rate of 45 cc. per hour, to the vessel. After about 18 hours in the reaction vessel, the D.E. of the syrup had dropped to about 65.9. During this time, the pH of the reaction medium had been maintained between about 5.0 and 6.0, by the addition of 1N sodium hydroxide.

The 65.9 D.E. conversion liquor was then subjected to an electrodialysis step. This step consisted of nine passes through a five cell electrodialysis unit which was operated at 50 volts and 25 p.s.i.

The electrodialysis unit contained 7 anion permeable membranes and 5 cation permeable membranes. The conversion liquor stream was sent to the unit at a flow rate of about 400 cc./min., a pressure of about 25 p.s.i., and a temperature of about 25° C. to 30° C. The waste water stream to the unit comprises 0.05 percent aqueous sodium gluconate and was sent to the unit at a flow rate of about 600 cc./min., a pressure of about 25 p.s.i., and a temperature of about 25° C. to 30° C. During the electrodialysis step, gluconate ion from the conversion liquor stream passed through the anion permeable membrane into the waste water stream. Active enzyme preparation in the conversion liquor stream did not pass through any membranes and thus remained in the effluent stream along with glucose. The effluent stream was returned to the reaction vessel for further enzymatic conversion. The waste water stream contained the product gluconic acid (as sodium gluconate).

The enzymatic conversion step and the electrodialysis step were alternately repeated for six cycles with additional glucose being added to the reaction vessel at the start of each enzymatic conversion step. No additional enzyme preparation was added during the six cycles. The results of this example are summarized in Table I.

Table I indicates that the process of the present invention provides a practical method for separating gluconic acid from the conversion liquor and recovering glucose oxidase for reuse. The electrodialysis step did not inactivate the glucose oxidase.

TABLE I

| Time (hours) | Glucose added (g,) | D.E. | Number of electro-dialysis passes | Sodium gluconate removed (g.) |
|---|---|---|---|---|
| 0 | 688 | 100 | | |
| 18 | | 65.9 | | |
| 20 | | 76.6 | 9 | 102 |
| 20 | 1,250 | 92.0 | | |
| 43 | | 62.2 | | |
| 44 | | 85.3 | 7 | 524 |
| 50 | 850 | 91 | | |
| 67 | | 69.0 | | |
| 68 | | 78.0 | 4 | 262 |
| 70 | 350 | 81.5 | | |
| 90 | | 70.0 | | |
| 91 | | 78.3 | 6 | 293 |
| 118 | | 65.1 | | |
| 120 | | 84.3 | 10 | 447 |
| 120 | 1,250 | 91.0 | | |
| 154 | | 61.0 | | |
| 157 | | 91.2 | 15 | 830 |

In one aspect of the present invention, it has been surprisingly discovered that the reaction rate at which the enzymatic conversion proceeds is considerably reduced at that point where about 50 percent of the glucose initially present in the reaction media has been converted. Therefore, in a preferred embodiment of the present invention the electrodialysis step is effected on the conversion liquor at the point where approximately 50 percent of the glucose has been converted.

While this invention finds particular utility in the enzymatic production of gluconic acid, it will be apparent that in its broader aspects the invention is useful for producing other ionizable organic acids prepared by enzymatic conversions. Thus, for example, amino acids prepared by the enzymatic conversion of proteins may be produced according to the invention.

The process is applicable to enzymatic oxidations of aldoses to the corresponding aldonic acids.

Enzyme preparations suitable for carrying out such enzymatic conversions are known in the art. Such an enzyme preparation is suitable for use in the present invention provided it is not inactivated by the electric current employed in the electrodialysis step.

In one embodiment of the present invention, pH control during the enzymatic conversion is accomplished by electrodialysis, thereby eliminating the necessity of any alcoholic addition. In such an embodiment gluconic acid (not sodium gluconate) is formed and immediately transfered through the membrane.

While the invention has been described in connection with specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a process for the enzymatic production of gluconic acid, wherein a glucose bearing material is subjected to enzymatic conversion with glucose oxidase to produce a conversion liquor, the improvement comprising subjecting said conversion liquor to an electrodialysis step to thereby separate gluconic acid and recover glucose oxidase.

2. A process as defined in claim 1 wherein said electrodialysis step is effected when about 50 percent of the glucose has been converted.

3. A process as defined in claim 1 wherein the pH during the enzymatic conversion is controlled to a value in the range of about 4.2 to about 7.

4. A process as defined in claim 1 wherein the pH during the enzymatic conversion is controlled to a value in the range of about 5 to about 6.

5. A process as defined by claim 1 wherein the recovered glucose oxidase is reused in a subsequent enzymatic conversion step.

6. A continuous process for the enzymatic production of gluconic acid comprising subjecting a glucose bearing material to an enzyme conversion using a glucose ozidase preparation, under continuously controlled temperature and pH conditions, subjecting the conversion liquor thereby obtained to an electrodialysis step to remove gluconate anions present in the conversion liquor while retaining the glucose oxidase in the conversion liquor, adding additional glucose bearing material to the conversion liquor and cyclically repeating the enzyme conversion step and the electrodialysis step.

7. A process for the enzymatic production of an aldonic acid which comprises subjecting an aldose bearing material to an enzymatic conversion to produce a conversion liquor, and subjecting said conversion liquor to an electrodialysis step to thereby separate an aldonic acid.

* * * * *